United States Patent [19]

Boles et al.

[11] Patent Number: 5,736,594

[45] Date of Patent: Apr. 7, 1998

[54] CEMENTING COMPOSITIONS AND METHODS USING RECYCLED EXPANDED POLYSTYRENE

[75] Inventors: Joel L. Boles; Jeffrey B. Boles, both of Spring, Tex.

[73] Assignee: B J Services Company, Tomball, Tex.

[21] Appl. No.: 623,212

[22] Filed: Mar. 28, 1996

[51] Int. Cl.$^6$ .............. C08J 11/00; C08K 3/00; C04B 16/08

[52] U.S. Cl. .............. 524/2; 521/47; 521/54; 521/55; 521/57; 428/71; 428/212

[58] Field of Search .............. 524/2; 521/47, 521/54, 55, 57; 428/71, 212

[56] References Cited

U.S. PATENT DOCUMENTS

| | | | |
|---|---|---|---|
| 3,272,765 | 9/1966 | Sefton | 260/2.5 |
| 3,563,313 | 2/1971 | Spangle | 166/292 |
| 3,804,058 | 4/1974 | Messenger | 166/292 |
| 3,899,455 | 8/1975 | Unterstenhoefer | 521/56 |
| 4,011,355 | 3/1977 | Mandish et al. | 521/57 |
| 4,306,395 | 12/1981 | Carpenter | 52/223 R |
| 4,398,958 | 8/1983 | Hodson et al. | 106/90 |
| 5,105,885 | 4/1992 | Bray et al. | 166/279 |
| 5,133,409 | 7/1992 | Bour et al. | 166/293 |
| 5,268,226 | 12/1993 | Sweeney | 428/70 |
| 5,292,467 | 3/1994 | Mandish et al. | 264/112 |
| 5,336,316 | 8/1994 | Dawson et al. | 106/724 |
| 5,472,498 | 12/1995 | Stephenson et al. | 428/403 |
| 5,482,550 | 1/1996 | Strait | 106/677 |

OTHER PUBLICATIONS

Ronald D. Beck, *Plastic Product Design*, 2d Ed., Van Nostrand Reinhold Co., New York, 1980, pp. 85–88.

*Primary Examiner*—Vasu Jagannathan
*Assistant Examiner*—Olga Asinovsky
*Attorney, Agent, or Firm*—Arnold, White & Durkee

[57] ABSTRACT

A novel and environmentally friendly well cementing composition comprising hydraulic cement and ground-up recycled expanded polystyrene having a low density, good compressive strength, good thermal conductivity, and the ability to float, and methods for cementing well bores with said cementing composition.

1 Claim, No Drawings

CEMENTING COMPOSITIONS AND METHODS USING RECYCLED EXPANDED POLYSTYRENE

FIELD OF THE INVENTION

The present invention relates generally to novel well cementing compositions and methods, and specifically to novel cementing compositions comprising hydraulic cement and ground-up recycled expanded polystyrene, and their use in cement slurries and methods for cementing well bores with said compositions.

BACKGROUND OF THE INVENTION

In cementing operations that are performed in oil and gas wells, a hydraulic cement is pumped down the well bore penetrating a subterranean formation into contact with the formation and allowed to set therein. Hydraulic cements can set under water and are often used in placement of pipes or casings within a well bore of a subterranean formation for the construction of oil, gas, and water wells. In a typical cementing operation, the cement composition is pumped down the inside of the pipe or casings and back up the outside of the pipe or casing through the annular space. In other words, the cement composition is pumped to the desired location in the well bore and allowed to harden to a solid mass. Upon setting, the cement composition seals the subterranean zones in the formation and supports the pipe or casing, and fluids are prevented from flowing into the well bore.

The prior art teaches that vesiculated polystyrene has been added to cement compositions used in oil and gas wells as a fluid-loss control agent. (U.S. Pat. No. 3,563,313). The prior art also teaches a method of making a lightweight concrete by incorporating expanded polystyrene beads in a concrete mix. (U.S. Pat. No. 4,398,958). It is known in the art that lightweight cementitious structural building elements may be formed from ground expanded cellular polystyrene from recycled sources, ground cellulosic fiber, and cement. (U.S. Pat. No. 5,482,550). A lightweight concrete made with expanded polystyrene foam particles coated with a binding agent is also known in the art. (U.S. Pat. No. 5,472,498).

However, the cement compositions of the present invention are advantageous in that they have low densities and low fluid loss properties together with increased compressibility. The increased compressibility of the set cement helps to prevent the incursion of pressurized formation gas into and around the cement composition prior to when it sets. The particles of expanded polystyrene can help control the loss of the cement slurry into lost circulation zones during cementing operations as well. The expanded polystyrene also provides increased insulation properties to the set cement products.

SUMMARY OF THE INVENTION

The well cementing compositions and methods of the present invention relate generally to the use of expanded polystyrene as a filler for cement which provide surprisingly improved characteristics. The cementing compositions of the invention are comprised of hydraulic cement, water present in an amount sufficient to produce a pumpable slurry, and recycled ground-up expanded polystyrene.

In particular, this invention relates to the use of ground-up expanded polystyrene in a cement mixture resulting in a lightweight, low density set cement product having good compressive strength, buoyant properties, and favorable thermal conductivity properties. This invention utilizes recycled expanded polystyrene as a cement filler resulting in an overall increase in the cement volume, the advantages being more product for less cost, while still retaining desirable cementing composition properties. The cementing composition of the present invention is useful for construction, oil field and oil well applications, as well as cementing operations in marine and subterranean formations.

A method is provided for cementing a well bore in which a hydraulic cement, water present in an amount sufficient to produce a pumpable slurry, and ground-up recycled expanded polystyrene are combined. The combined slurry is then pumped to the desired location in the well bore and the cement slurry is allowed to harden to a solid mass.

Additional objects, features, and advantages will be apparent in the written description which follows.

DETAILED DESCRIPTION OF THE INVENTION

The present invention relates to a novel cementing composition and the method of using the cementing composition. The cementing composition is composed of hydraulic cement, recycled ground-up expanded polystyrene, and water.

In this disclosure, the term "hydraulic cement" is meant to encompass any cement that hardens or sets with water. Hydraulic cements, for example, include Portland cement, aluminous and pozzolan cements, and the like. The term "hydraulic cement" is also intended to include cements having minor amounts of extenders, such as bentonite, sodium silicate, and also is intended to include cements used either without any appreciable sand or aggregate material, or such cements admixed with a granular filling material, such as sand, ground limestone, fly ash, and the like. While various hydraulic cements can be utilized in forming the compositions of the invention, Portland Cement of the various types identified as API Classes A through H and J are preferred. Such cements are defined in API Specification For Materials and Testing for Well Cements, API Specification 10, Third Edition, Jul. 1, 1986 of the American Petroleum Institute which is incorporated herein by reference.

Mixing water is utilized with the dry cement composition to produce a fluid pumpable slurry of suitable consistency. The water can be of any type commonly used in the cement industry, such as fresh water, brines, sea water, and the like. The water can have additives such as potassium chloride, dispersants, accelerators, viscosifiers, and retarders. The amount of water used can vary over a wide range dependent upon the consistency of the slurry required, the strength requirement for the particular job, and other factors. API Specification 10, which is known in the cement industry, describes an apparatus and method for measuring the consistency of cement slurries in terms of Bearden units of consistency (Bc). A pumpable slurry should measure in the range of about 2–20 Bc, and preferably be in the range of 5 to 11 Bc.

The cementing compositions of the present invention include ground-up recycled expanded polystyrene. Recycled expanded polystyrene was considered a unique and favorable additive for cement because it would help remove used expanded polystyrene from the environment, providing a solution to the environmental disposal problem associated with expanded polystyrene, while at the same time providing enhanced properties to cementing compositions and set cement products. As a filler for cement, recycled expanded polystyrene provides additional volume, resulting in more product for less cost. The very light weight of expanded polystyrene proves beneficial in construction, where its use results in low cost building materials with improved insulation properties. The use of recycled expanded polystyrene in cement is advantageous in oil and well cementing, where the cement-expanded polystyrene material is useful where low densities and good compressive strengths are required for cementing across formations that are weak and have low fracturing gradients. The cementing composition also has marine applications, as it is a low cost material with good compressive strength and buoyancy.

The cementing compositions of this invention comprise hydraulic cement, ground-up expanded polystyrene, a wetting agent, and water in a sufficient amount to produce a pumpable slurry. In a preferred embodiment, the cementing composition comprises hydraulic cement, 1% to 15% ground-up expanded polystyrene by weight of the cement, a wetting agent in a sufficient amount to water-wet the expanded polystyrene particles, 38% water by weight of the cement, and 2% calcium chloride by weight of the cement. The preferred hydraulic cement is Class H cement.

The methods of this invention for performing cementing operations in well bores and subterranean environments comprise the steps of forming a cementing composition of the type described above, introducing the cementing composition into the formation or zone to be cemented by way of the well bore penetrating the formation, and allowing the cementing composition to set into a hard mass in the formation. A preferred method comprises the steps of forming a cementing composition comprised of Class H hydraulic cement, ground-up recycled expanded polystyrene particles, a wetting agent to water-wet the expanded polystyrene particles, and sufficient water to form a pumpable slurry; introducing the cementing composition into the subterranean formation or zone to be cemented; and allowing the cementing composition to set into a hard mass in the formation.

EXAMPLE 1

In initiating the testing of the cementing composition, the breakdown of the ground-up recycled expanded polystyrene into very small particles that could be mixed with and used in cement proved to be problematic, as expanded polystyrene cannot be ground-up under normal room temperatures (60°–80° F.) as some materials such as glass, ceramics, or harden resins. In an attempt to breakdown the particles in a Waring blender at high speeds, some of the expanded polystyrene was cut to a small size, while the majority remained only partially reduced. In addition, the expanded polystyrene particles became statically charged and difficult to work with. Upon the addition of water, the problem of static charge was only slightly reduced. The expanded polystyrene particles finally became manageable upon the addition of water and a wetting agent, such as Igepal™CO-630, a nonionic surfactant that is soluble in water, ethanol, ethylene glycol, ethylene dichloride, xylene and corn oil. Other foamers and/or surfactants may be useful in preparing the expanded polystyrene, such as cationic, anionic, and amphoteric materials.

The addition of Igepal™CO-630 and water eliminated the problem of static charge, and the expanded polystyrene, water, and Igepal™CO-630 combination was then mixed in the Waring blender. The result was water-wet expanded polystyrene particles of a uniform small size which could then be mixed with the cement in a cement slurry.

Mixtures of Class H cement, calcium chloride, water, and the water-wet expanded polystyrene particles were then prepared. Class H cement is a hydraulic cement intended for use as a basic well cement from surface to a depth of 8,000 feet as manufactured, and can be used with accelerators and retarders to cover a wide range of well depths and retarders to cover a wide range of well depths and temperatures. Class H cement is obtained by grinding Portland cement clinker, consisting essentially of hydraulic calcium silicates, usually containing one or more of the forms of calcium sulfate as an interground addition. Other hydraulic or oil-well cements such as Classes A–G and Class J may be useful. Construction or slag type cements may prove useful as well, in construction type applications.

The mixtures were comprised of from 1% to 15% expanded polystyrene by weight of the cement component, with a set amount of water at 38% by weight of the cement, and a set amount of calcium chloride at 2% by weight of the cement. Samples 1 and 1A were controls and had no expanded polystyrene. Samples 2 and 2A had 1% expanded polystyrene by weight of the cement. Samples 3 and 3A had 5% expanded polystyrene by weight of the cement. Samples 4 and 4A had 7.5% expanded polystyrene by weight of the cement. Samples 5 and 5A had 15% expanded polystyrene by weight of the cement.

The combination of materials was mixed in a Waring blender until a uniform cement slurry was obtained, and the mixture was then poured into plastic bottles. The slurries were then allowed to set at room temperature and atmospheric pressure for 24 hours, at which time all of the samples were visually examined for uniformity and solidity. All of the samples were set hard and appeared to vary slightly in the uniformity of distribution of the expanded polystyrene particles, with the samples containing the higher percentages of expanded polystyrene particles having the most uniform distribution. Following this initial inspection, a small amount of water was placed on top of each set sample to keep the mixture moist so that it would set uniformly, and each bottle was then resealed and allowed to set for an additional five days.

After the additional five days at 80° F. and atmospheric pressure, the set cement samples were removed from the plastic bottles and measured for total weight and volume, and final densities and average densities were determined. The results are set forth in Table 1 below.

TABLE 1

| TEST SAMPLE | TOTAL WEIGHT (g) | TOTAL VOLUME ($cm^3$) | FINAL DENSITY ($g/cm^3$) | AVERAGE DENSITY PER MIXTURE (avg. $g/cm^3$) |
|---|---|---|---|---|
| 1 | 243.74 | 124.86 | 1.95 | |
| 1A | 257.53 | 130.39 | 1.98 | 1.97 |
| 2 | 247.38 | 141.56 | 1.75 | |
| 2A | 256.18 | 181.62 | 1.41 | 1.58 |
| 3 | 274.28 | 211.25 | 1.30 | |
| 3A | 274.12 | 189.19 | 1.45 | 1.38 |
| 4 | 275.59 | 238.83 | 1.15 | |
| 4A | 273.23 | 233.87 | 1.16 | 1.16 |
| 5 | 279.13 | 317.02 | 0.88 | |
| 5A | 278.03 | 307.89 | 0.90 | 0.89 |

The results demonstrated that upon the addition of increasing amounts of expanded polystyrene, the final density of the cement product decreased.

EXAMPLE 2

Portions of each sample of Example 1 were then cut using a curing saw equipped with a diamond blade, and specimens taken from the center of each sample were then washed, dried and measured. The compressive strength of each specimen was then determined using a compressive strength machine manufactured by Soil Test Corporation set at loading rate of 1000 psi force per minute. The results are set forth in Table 2 below.

TABLE 2

| TEST SAMPLE | COMPRESSIVE STRENGTH (PSI) |
| --- | --- |
| 1 | 2738 |
| 2 | 1380 |
| 3 | 633 |
| 4 | 1044 |
| 5 | 442 |

The results demonstrated that even with the large increase in volume due to the use of expanded polystyrene and the decrease in the overall density, the final cement material retained reasonable compressive strength.

EXAMPLE 3

A set sample of the base cement containing 0%, 5%, 7.5% and 15% recycled ground-up expanded polystyrene were placed into a large container of fresh Tomball, Texas water. The results demonstrated that upon the addition of 5% expanded polystyrene, the samples floated. Thus, the addition of 5% expanded polystyrene to a base cement confers the property of buoyancy.

TABLE 3

| Sample | Base Cement with % Expanded Polystyrene | Results |
| --- | --- | --- |
| 1 | 0% | The sample was heavier than water and sank to the bottom of the container. |
| 2 | 5% | The sample was lighter than water and floated. |
| 3 | 7.5% | The sample was lighter than water and floated. |
| 4 | 15% | The sample was lighter than water and floated. |

EXAMPLE 4

A one inch thick wafer of the base cement containing 0% expanded polystyrene by weight of cement was placed on the top of a preheated Thermolyne Hot Plate, preheated to 200° F. A thermometer was placed on the surface of the hot plate, and another thermometer was placed on top of the cement wafer. Temperature readings were taken at 5, 10, 15, and 20 minute. The tests were repeated using cement wafers containing 5% and 15% expanded polystyrene.

TABLE 4

| | Temperature of | Temperature on Top of Cement Wafer (°F.) | | |
| --- | --- | --- | --- | --- |
| Time (min) | Hot Plate (°F.) | 0% Expanded Polystyrene | 5% Expanded Polystyrene | 15% Expanded Polystyrene |
| 5 | 200° | 140° | 97° | 80° |
| 10 | 200° | 150° | 110° | 90° |
| 15 | 200° | 150° | 115° | 100° |
| 20 | 200° | 150° | 118° | 105° |

The cement wafer containing no expanded polystyrene retained heat for over 5 minutes after being removed from the hot plate. The cement wafers containing 5% and 15% expanded polystyrene cooled quickly and could be handled without gloves within one minute after being removed from the hot plate.

The use of recycled expanded polystyrene as a filler for cement provides the following desirable properties in a cementing composition: the cost of the final cement material is decreased, as less amounts of cement are required to prepare the same volume of set cement product; the set cement product has a good compressive strength as well as the ability to float in water, as the use of expanded polystyrene provides buoyancy to the set cement material; the addition of expanded polystyrene provides low density, high compressive strength slurries, and provides additional flexibility of cement slurry densities. Another advantage is that recycled expanded polystyrene as an additive provides compatibility with all classes of cement and most cement additives, as expanded polystyrene is a nonreactive material. Finally, the use of recycled expanded polystyrene is beneficial in that it provides a solution to the problem of removing expanded polystyrene from the environment after use.

Those skilled in the art will recognize that, while specific embodiments have been illustrated and described, various modifications and changes may be made without departing from the spirit and scope of the invention.

What is claimed is:

1. A method of cementing a well bore, comprising the steps of:

mixing together Class H cement, about 2% calcium chloride by weight of the cement, from about 1% to about 15% ground-up recycled expanded polystyrene particles by weight of the cement, and water in an amount sufficient to produce a pumpable cement slurry;

pumping said cement slurry to the desired location in said well bore; and allowing said cement slurry to harden to a solid mass.

* * * * *